(12) United States Patent
Rodriguez Hernandez et al.

(10) Patent No.: US 8,808,508 B2
(45) Date of Patent: Aug. 19, 2014

(54) SYSTEM AND METHOD FOR OBTAINING HYDROCARBONS FROM ORGANIC AND INORGANIC SOLID WASTE

(76) Inventors: Jesus Eduardo Rodriguez Hernandez, Guadalajara (MX); Antonio Gomez Rivera, El Paso, TX (US); Jose de Jesus Mansilla, Guadalajara (MX); Mario Gomez Rivera, Ciudad Juarez (MX)

( * ) Notice: Subject to any disclaimer, the term of this patent is extended or adjusted under 35 U.S.C. 154(b) by 777 days.

(21) Appl. No.: 12/448,459

(22) PCT Filed: Dec. 20, 2006

(86) PCT No.: PCT/MX2006/000153
§ 371 (c)(1),
(2), (4) Date: Jun. 19, 2009

(87) PCT Pub. No.: WO2008/075931
PCT Pub. Date: Jun. 26, 2008

(65) Prior Publication Data
US 2009/0288938 A1     Nov. 26, 2009

(51) Int. Cl.
  C10B 53/00    (2006.01)
  C10B 47/32    (2006.01)
  C10B 57/18    (2006.01)
(52) U.S. Cl.
  USPC ............... 201/25; 201/35; 201/44; 201/45; 202/110; 202/112; 202/113; 202/117
(58) Field of Classification Search
  USPC ............... 201/1, 25, 26, 29, 32, 35, 44, 45; 202/110, 112, 113, 117; 585/240, 241
  See application file for complete search history.

(56) References Cited

U.S. PATENT DOCUMENTS

| | | | |
|---|---|---|---|
| 4,052,293 A | 10/1977 | Mercer et al. | |
| 4,084,521 A * | 4/1978 | Herbold et al. | 110/242 |
| 4,740,270 A | 4/1988 | Roy et al. | |
| 5,242,245 A | 9/1993 | Schellstede et al. | |
| 5,302,254 A | 4/1994 | Martin et al. | |
| 6,105,275 A | 8/2000 | Aulbaugh et al. | |
| 6,226,889 B1 * | 5/2001 | Aulbaugh et al. | 34/424 |
| 7,344,622 B2 * | 3/2008 | Grispin | 202/97 |
| 7,824,523 B2 * | 11/2010 | Maskarinec et al. | 201/32 |

FOREIGN PATENT DOCUMENTS

| | | |
|---|---|---|
| ES | 2205142 | 5/2004 |
| WO | 02070151 | 9/2002 |

* cited by examiner

Primary Examiner — Jill Warden
Assistant Examiner — Joye L Woodard
(74) Attorney, Agent, or Firm — Issac Estrada; Peacock Myers P.C.

(57) ABSTRACT

This invention relates to a system for obtaining hydrocarbons from organic or inorganic solid waste, wherein said system comprises: an inlet chamber, within which is a mixer assembly which mixes and conveys the waste through said chamber, which is also at ambient temperature, thus avoiding any thermal shock to the solid waste for processing; a dehydration chamber with a mixing assembly therein, and the upper part of this chamber contains an expansion chamber for promoting more efficient molecular breakdown; the thermal breakdown is carried out in two reactors which are operated at different temperatures, the first thermal disassociation reactor which has inside a mixer unit, and which in its upper part houses an expansion chamber, the second thermal breakdown reactor, therein has a mixer unit, and in the upper portion thereof houses an expansion chamber and at the top end thereof a vertical expansion tower; wherein the thermolytic steam is homogenized, a separator of heavy hydrocarbons, which does not require an additional cooling system, a multiple valve determines the temperature and oxygen content of the vapors and conveys them to the expansion tower in order to optimize the production of hydrocarbons, and to obtain a liquid hydrocarbon with high heating value.

3 Claims, 16 Drawing Sheets

SYSTEM AND METHOD FOR OBTAINING HYDROCARBONS FROM ORGANIC AND INORGANIC SOLID WASTE

APPLICATION CROSS-REFERENCES

This application claims priority from International Application Number PCT/MX2006/000153 filed on Dec. 20, 2006 and published in Spanish.

FIELD OF THE INVENTION

The present invention is in the petrochemical, environmental, mechanical, and electrical field because it provides an apparatus and method to obtain hydrocarbons from solid recycling waste or residues, organic or inorganic, to obtain liquid, solid, and gaseous hydrocarbons.

BACKGROUND

Various devices, apparatuses and methods for obtaining hydrocarbons from solid waste by pyrolysis or thermolysis are known, in which a reaction chamber is used where the solid waste is placed, and inside of which there is an endless screw to convey the waste through the reaction chamber; this endless screw having the limitation that it cannot convey metallic waste, glass, rocks, and so forth, since in addition to not being susceptible to the thermolysis or pyrolysis, these damage the endless screw, causing blocks, this event thereby affecting these technologies' process to obtain hydrocarbons. Patent application WO2005044952 refers to an apparatus to process waste that has a cylindrical vacuum reactor that, when heated from 250 to 410° C., subjects the matter to be processed to a thermal shock, producing dioxins and other contaminant compounds inside the reactor, thus this application differs because there is not a thermal shock of the matter for processing since the organic and inorganic solid waste inlet cylinder is not pre-heated, they remain at ambient temperature, thus preventing the thermal shock which would produce these harmful substances. It also expresses that it comprises an endless screw to remove the mixture within the reactor, this endless screw turning in only one direction accumulates waste at one point and is jammed, which prevents the thermal dissociation of the waste.

U.S. Pat. No. 5,720,232 relates to a method and apparatus to process waste tires that are placed in a chamber where vacuum is brought about to induce pyrolysis from 176.6 to 343.3° C., the chamber includes a vapor collector, the mixture of gas and liquid extracted is separated in a liquid condenser and the tire bits are removed by an endless screw. The apparatus also includes three filling chambers, a transformation reactor and carbon extraction. That apparatus only processes waste tires while our system processes any waste material organic or inorganic.

DESCRIPTION OF THE INVENTION

The present invention relates to a system and semi continuous process for obtaining solid, liquid, and gaseous hydrocarbons from the thermal dissociation of solid organic and inorganic waste, the characteristic details of which are clearly shown in the following description and accompanying figures, and an illustration of it and following the same reference numbers to indicate the parts and figures shown.

Figure 1:
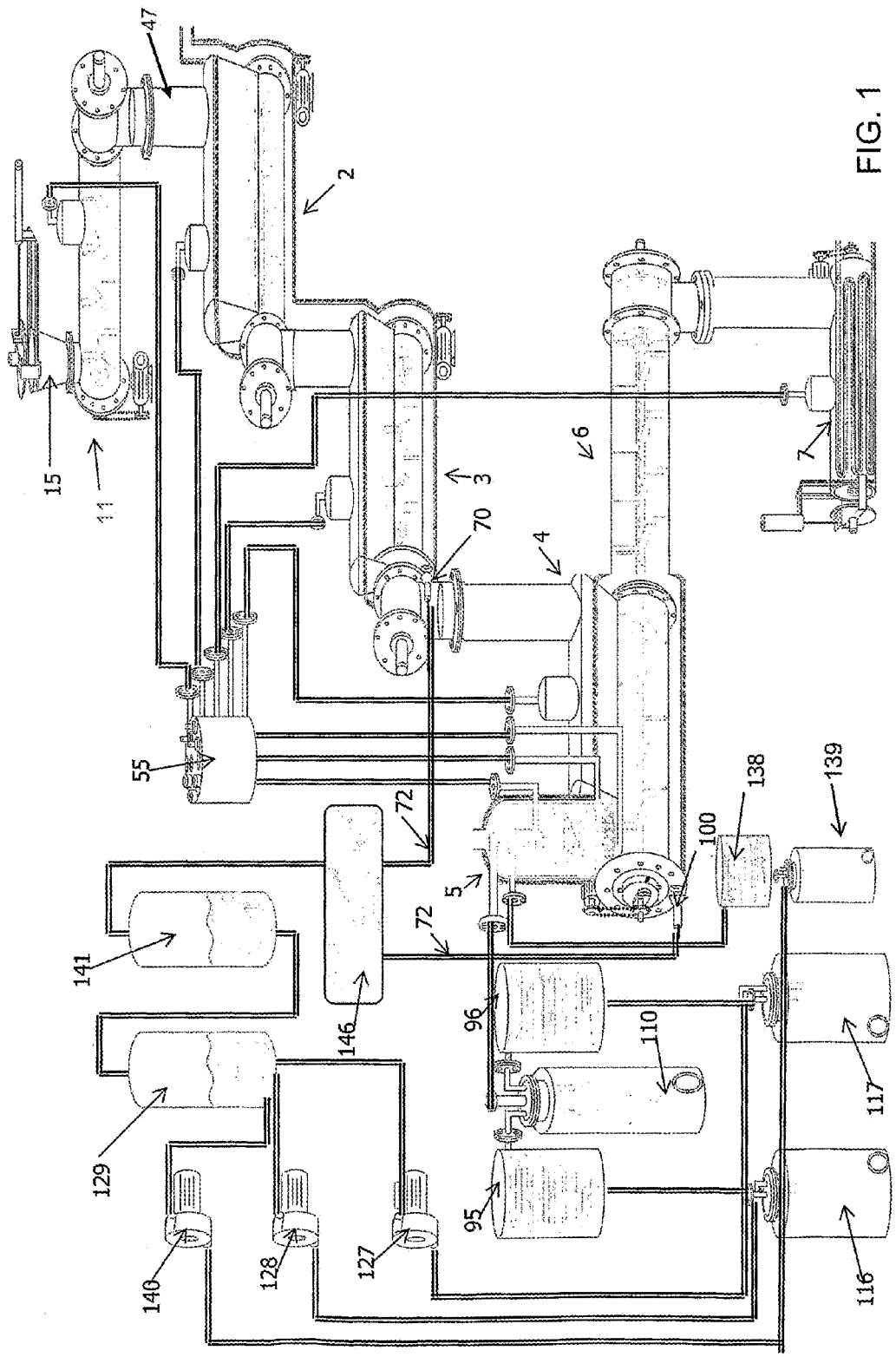
FIG. 1 illustrates a schematic view of the machine to obtain hydrocarbons from solid waste, organic and inorganic of the present invention.

With reference to said figures the system to obtain hydrocarbons from organic and inorganic solid waste of the present invention is basically comprised of: a hopper 15, a solid, organic and inorganic waste intake chamber 11, a dehydration reactor 2, two thermal dissociation reactors 3 and 4 respectively, a solid fraction extraction of the thermal dissociation chamber 6, a chamber 7 for cooling of the solid fraction of the thermal dissociation, a cylinder for the separation of heavy hydrocarbons 110, two thermolytic vapor heat exchangers 95 and 96, two cylinders to separate light hydrocarbons 116, and 117, a cylinder to separate the liquids 139, a third heat exchanger for water vapor 138, two synthetic gas purifying reservoir 129, 141, a gas filter 145, a synthetic gas accumulating reservoir 146, three vacuum pumps 127, 128, and 140, a multiple valve 55;

The hopper 15 enables the intake of the organic and inorganic solid waste formed by a funnel-shaped inverted cylinder, which in its upper opening 16, a ring 19 is affixed on the top rim of said hopper which, in its interior edge with a 10° perimetral cut-in resembling a conical ring, which allows the lid 20 to sit, said solid cylindrical lid 20 located above this ring 19, which at the same time has a 10° cut-in on its inferior end so that when it couples with the ring 19 there is a perfectly hermetic seal, this lid at the same time has a hermetic seal and sliding mechanism 74, that allows the intake of waste into the hopper 15; wherein said mechanism comprises a handle 21, the top of which has a piston 22 in a vertical position to take off, position, and provide pressure to said lid 20 toward the conical ring 19, such that a hermetic seal forms; in the top opening of the hopper 15 rails 24 are welded and extend diametrically from said hopper's opposite sides in a horizontal position to allow the handle 21 to slide when the hopper 15 is opened or closed; on the opposite end of the hopper there is a second piston 23 in a horizontal position to slide the handle 21 over said rails 24; it is worth mentioning that on lid 20 there is a rectangular plate 17 in a vertical position, having an elliptical boring to prevent the axle of the second piston 23 from bending when the lid is set on the hopper 15. The bottom end of the hopper 15 is connected to the top part of one of the ends of the organic and inorganic waste intake chamber 11 by a conventional coupling 25.

Figure 2:
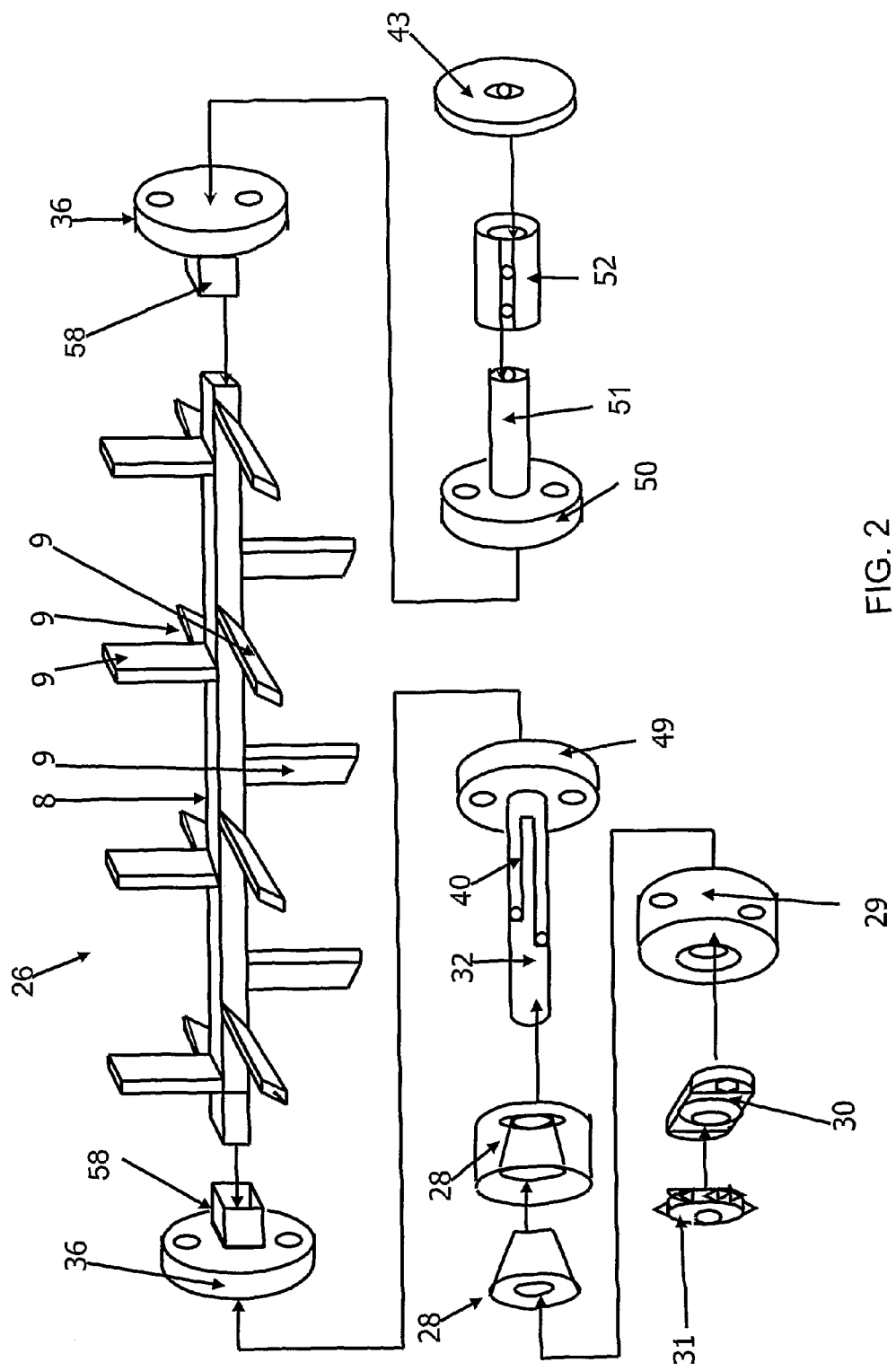
FIG. 2 is a perspective view of the mixing assembly.
Figure 3:
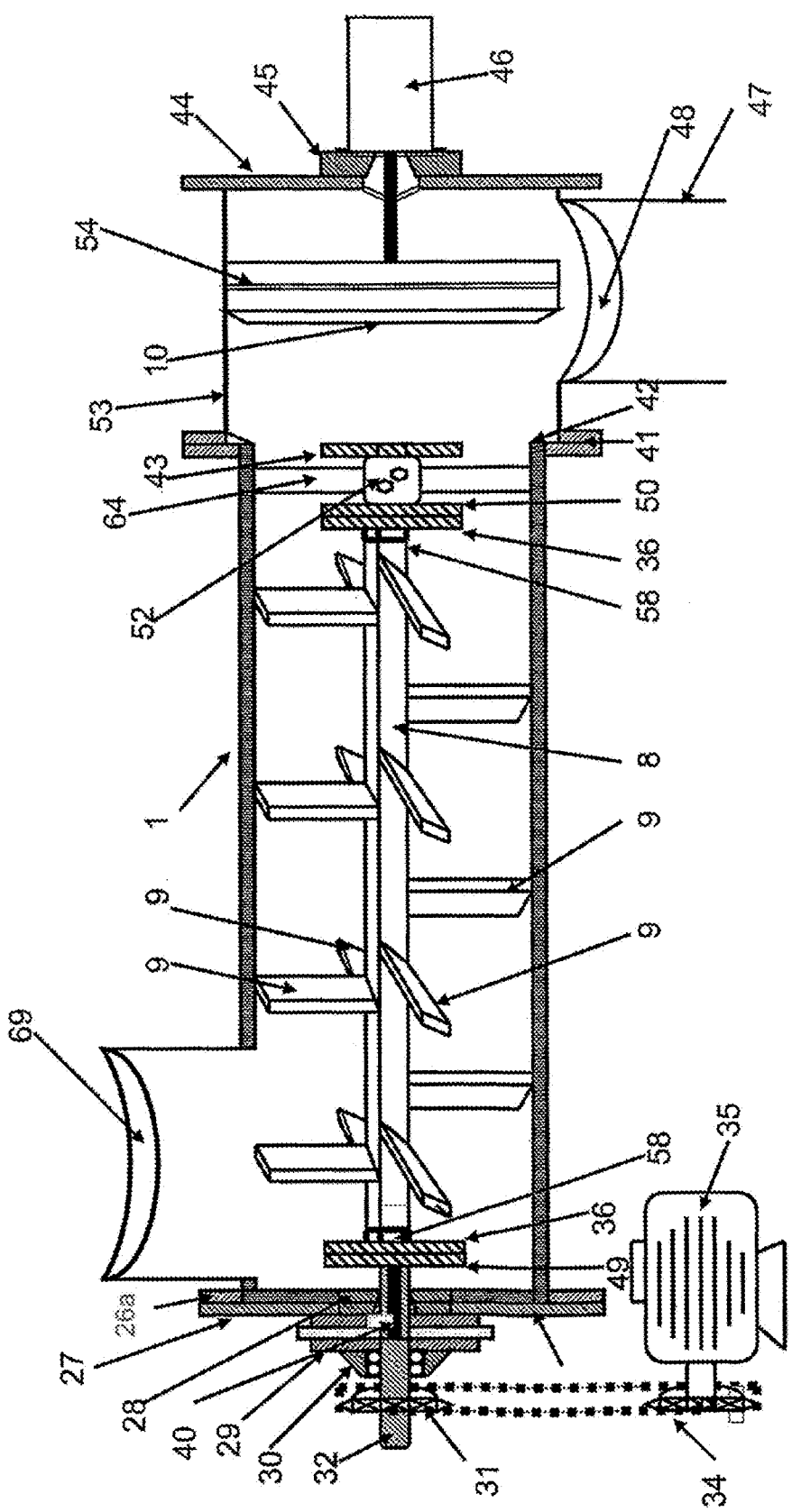
FIG. 3 is a schematic section of the interior of the cylinder, which is the base for the chambers and reactors.
Figure 4:
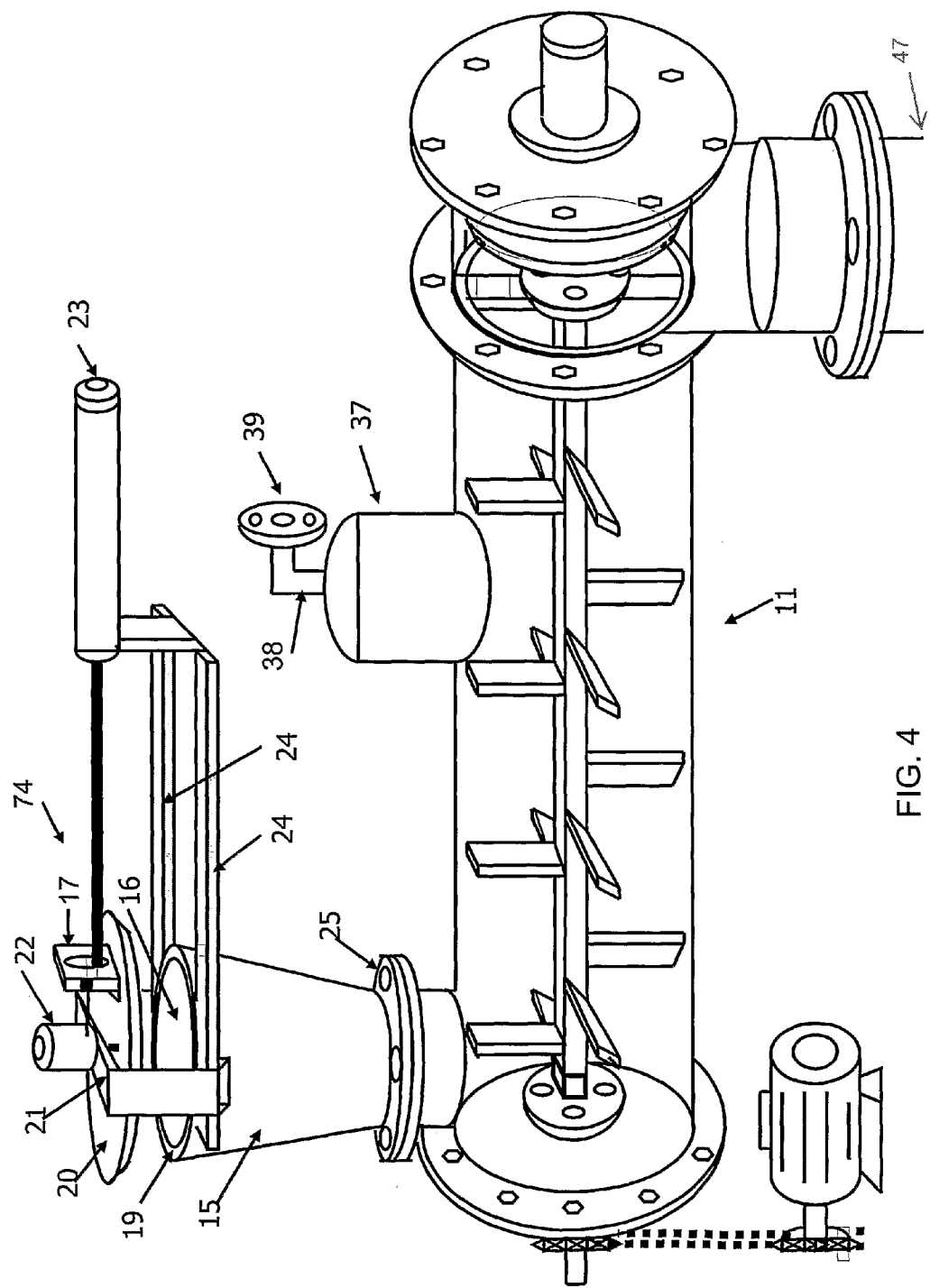
FIG. 4 is perspective view of the intake chamber of the organic and inorganic solid waste of the referenced machine for obtaining hydrocarbons.
Figure 5:
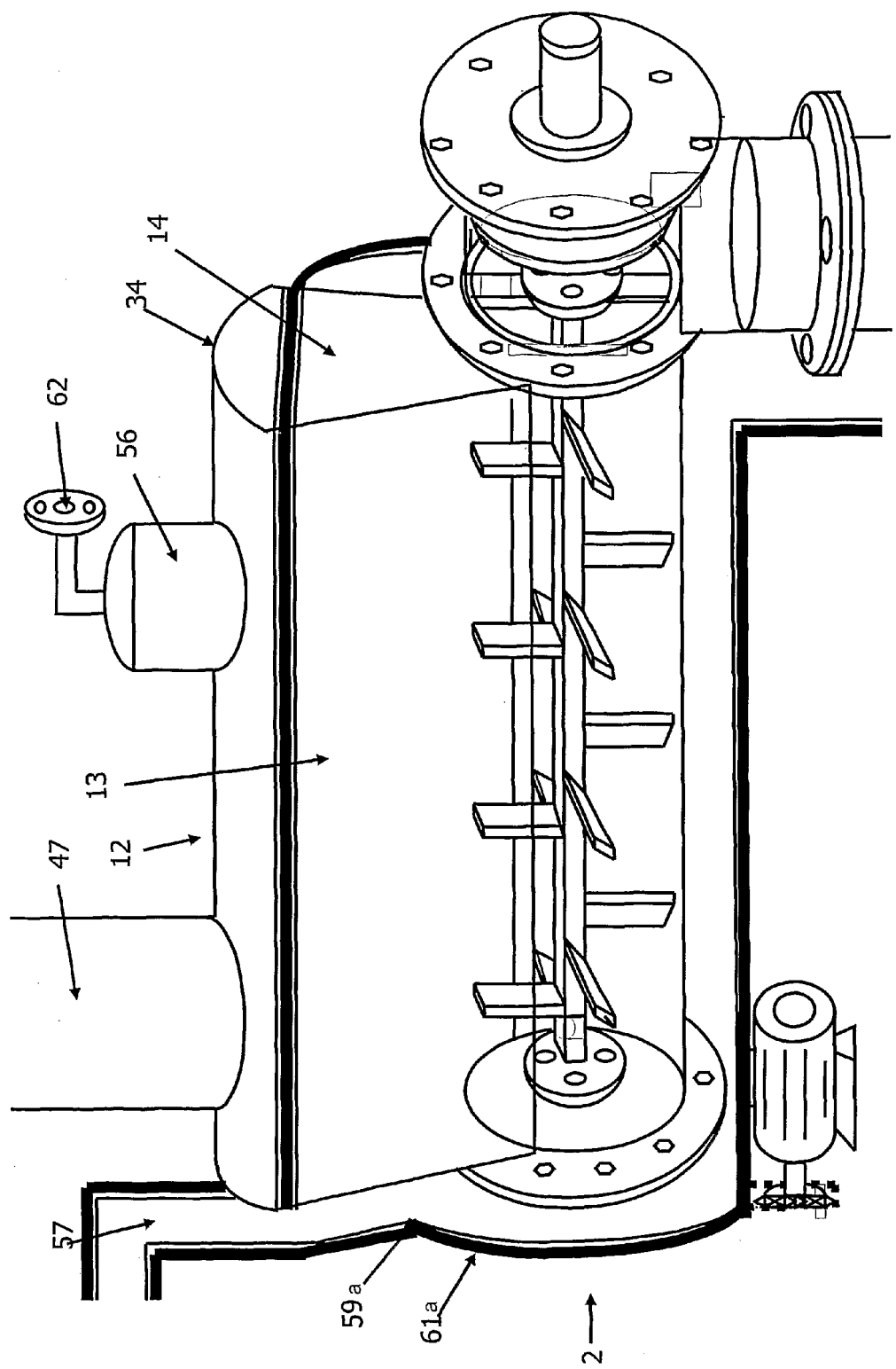
FIG. 5 is a perspective view of the dehydration reactor of the machine of the present application.
Figure 6:
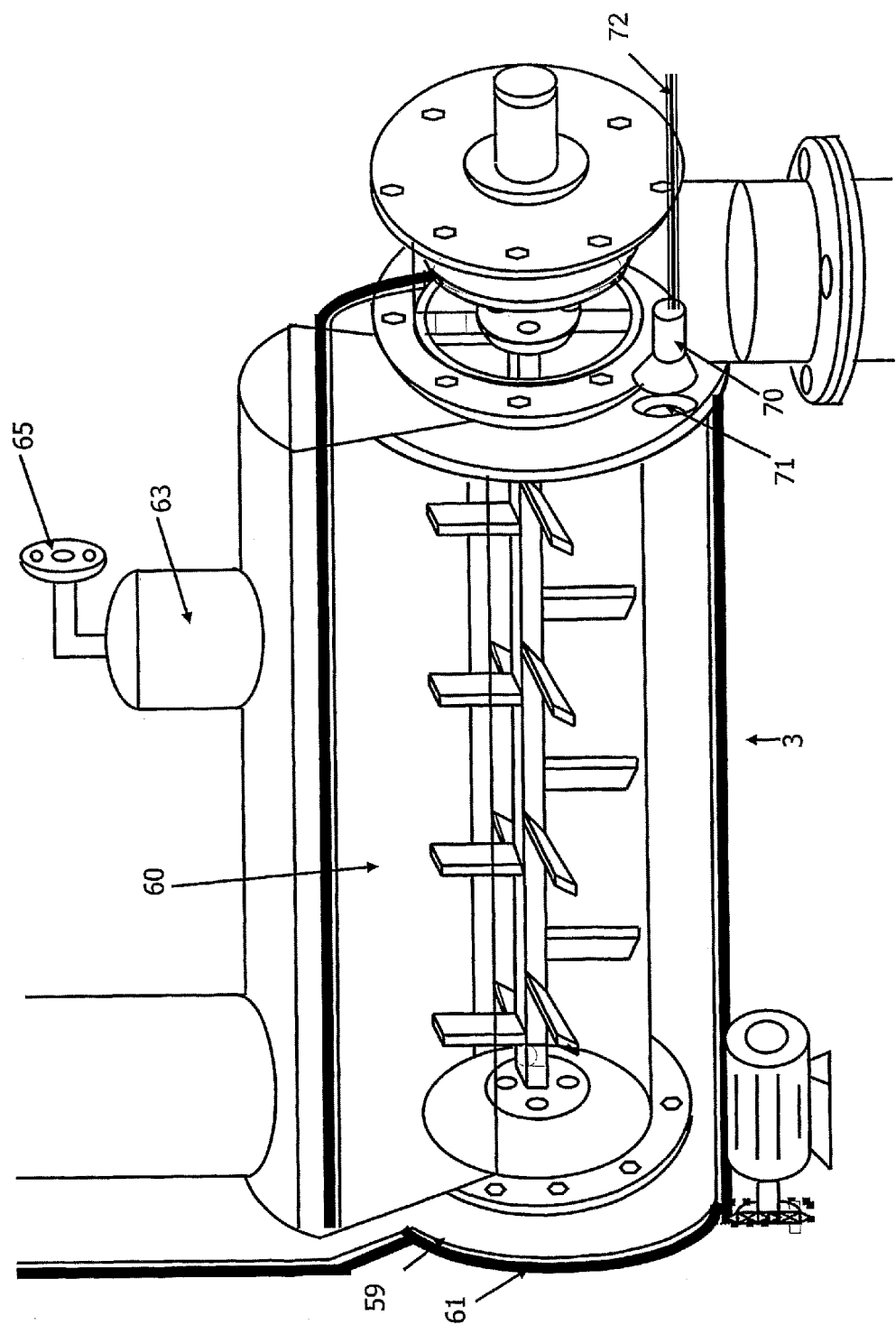
FIG. 6 is a perspective view of the first thermal dissociation reactor of said machine herein referenced.

The organic and inorganic waste intake chamber 11, which allows the intake of the waste, extracts the air and oxygen that accompanies the waste, preventing the thermal shock of the waste entering the system, is composed of a metallic hollow cylinder 1 in a horizontal position, resistant to a vacuum pressure of −0.56 Kg/cm$^2$; which has in its interior a waste mixing assembly 26 in a horizontal position, which is composed of a square shaft 8 that has perpendicular rectangular projections 9 diagonally throughout the length of its four sides (as is clearly shown in FIG. 2). The mixer assembly 26 is fixed to cylinder 1 through the end sides of the square shaft 8. For this purpose, both ends of the square shaft 8 join the discs 36 in a vertical position, which have a square connector 58 in their centers, having a square cavity 58 on their center with dimensions sufficiently large to allow an end of the square shaft 8 to be introduced tightly. One of the connector discs 36 joins, on the opposite side where the square cavity 58 is, a second disc 49 with the same dimensions as the first disc 36; wherein the second circular piece 49 has on the face opposite to the face that connects the first disc 36, a central round shaft 32, in a horizontal position to enter into a conical axle box 28, wherein said axle box attaches to the hatch 27 of the waste intake chamber 11. The central round shaft 32 has an internal duct 40 in a "U" shape, horizontally placed, so that refrigeration liquid can flow and said shaft will not dilate by increase temperature. Said central round shaft is embraced by a cooling device 29; followed by a bearing 30 to fix the round shaft 32; and a notched wheel 31 to allow said square shaft 8 to rotate through a chain 33 coupled to a motor 35 (See FIG. 3). The connecting disc 36 on the other end of the square shaft 8 connects a circular piece 50 on its face opposite to its square cavity 58; wherein said circular piece 50 has on its center a horizontal round shaft 51 that enters an axle box 52 to allow rotation and support the central round shaft 51, as this shaft is suspended and fixed because of braces 64, which are metallic projections extending from the internal wall of cylinder 1 toward the axle box 52, on opposite end of said axle box there is an axial block 43 which works as a lid preventing dust and residue from entering the axle box and fixes the central round shaft 51. The open ends of cylinder 1 are sealed by hatch 27 and 44 (see FIG. 3), wherein the left hatch 27 is fixed to the chamber by a conventional coupling 26a in front of the cooling device 29. On the end where the right hatch 44 is placed, a ring 41 is welded on the edge of cylinder 1 beforehand, which, on its internal edge a 10 perimetral cut-in 42 resembling a conical ring, on which is fixed, on the top edge of said cut-in 42, a calibrated cylinder 53 in the interior of which a solid cylindrical interconnection valve 10 slides, which valve has at the same time a 10 cut-in on its left side so that when it couples with the ring's 41 cut-in 42 there is a hermetic seal (see FIG. 3), in the middle of valve 10 perimetral circular canal that houses a teflon ring 54 to increase tightness of the hermetic seal on the calibrated cylinder 53; right hatch 44 is fixed to the right end of the calibrated cylinder, whose outer diameter is greater than the cylindrical body 1, matching that of the ring 41, to achieve a fitting between both pieces; a ring-shaped piece 45 is added to the center of the right hatch 44 with an internal mechanism that prevents air from coming inside the cylindrical body 1; finally, the axle of an actuator piston 46 is introduced in the center of the ring-shaped piece 45 to thrust the interconnection valve 10 inside of the calibrated cylinder. The cylindrical body 1 has on its top (see FIG. 4) an extraction tower 37 of air and volatile particles, which are conducted through a pipe 38 that conveys them toward a multiple valve 55. Finally, calibrated cylinder 53 has an inferior perforation 48 in order to couple a vertical pipe 47 to connect the intake chamber 11 to the dehydration reactor 2.

The dehydration reactor 2 that eliminates any trace of moisture that the organic or inorganic waste includes at the moment of entering the system, is built similarly to the intake chamber 11, but differs in that the dehydration reactor 2 contains an upper rectangular aperture of one third the diameter of its cylinder, that traverses its own longitude, to obtain a connection with an expansion chamber 12, consisting of a pair of longitudinal metallic 13 rectangular walls, that are vertically welded, but with an inclination of 15 in the outward direction commencing at the edge of the longitudinal aperture, with a conical appearance; of a pair of truncated semi conical transversal metallic walls 14, arranged in a 90 vertical position with respect the to cylinder, and it is used to cover the apertures at the ends of the mentioned chamber; and a half-pipe shaped piece 34 serves as a upper lid to the expansion chamber 12, this expansion chamber 12 allows elevation of water vapors generated by the organic and inorganic solid waste; thus in this case the extraction tower 56 is above the expansion chamber 12. Another variant of this dehydration reactor is that it is placed inside a heat "casing" 59, but not entirely, to provide a temperature of 180 inside the dehydration chamber 2, by means of heat generated by a first gas burner, and gases obtained are expelled to the environment by means of an escape duct 57 vertically positioned on the upper right end of the heat "casing" 59, it is worth mentioning that it has an external insulator layer 61 that precludes heat diffusion and concentrates it inside said casing. In the same way as the intake chamber 11, the dehydration reactor 2 has an interconnection pipe to connect it to the first thermal dissociation reactor 3.

Thermal dissociation is initiated on the first dissociation reactor 3, forming a "crude"vapor (consisting of a vapor that has not yet reached ideal temperature of 420 therefore if this vapor would be extracted and condensed it would form a low calorific power hydrocarbon). This first reactor whose configuration is the same as that of the dehydrator reactor 2, differs only in that the expansion chamber 60 is on a smaller scale, given that the "crude" vapors that are going to be obtained require less space since they are not that expansive. Another detail about this first reactor 3 is that the heat "casing" 59a has a perforation 71 in the right bottom side to connect a gas burner 70 so it provides a temperature of 280 to the interior of the first reactor 3. Besides heat being conducted toward dehydration chamber 2, this first reactor is connected to the second thermal disassociation reactor by means of an interconnection pipe.

Figure 7:
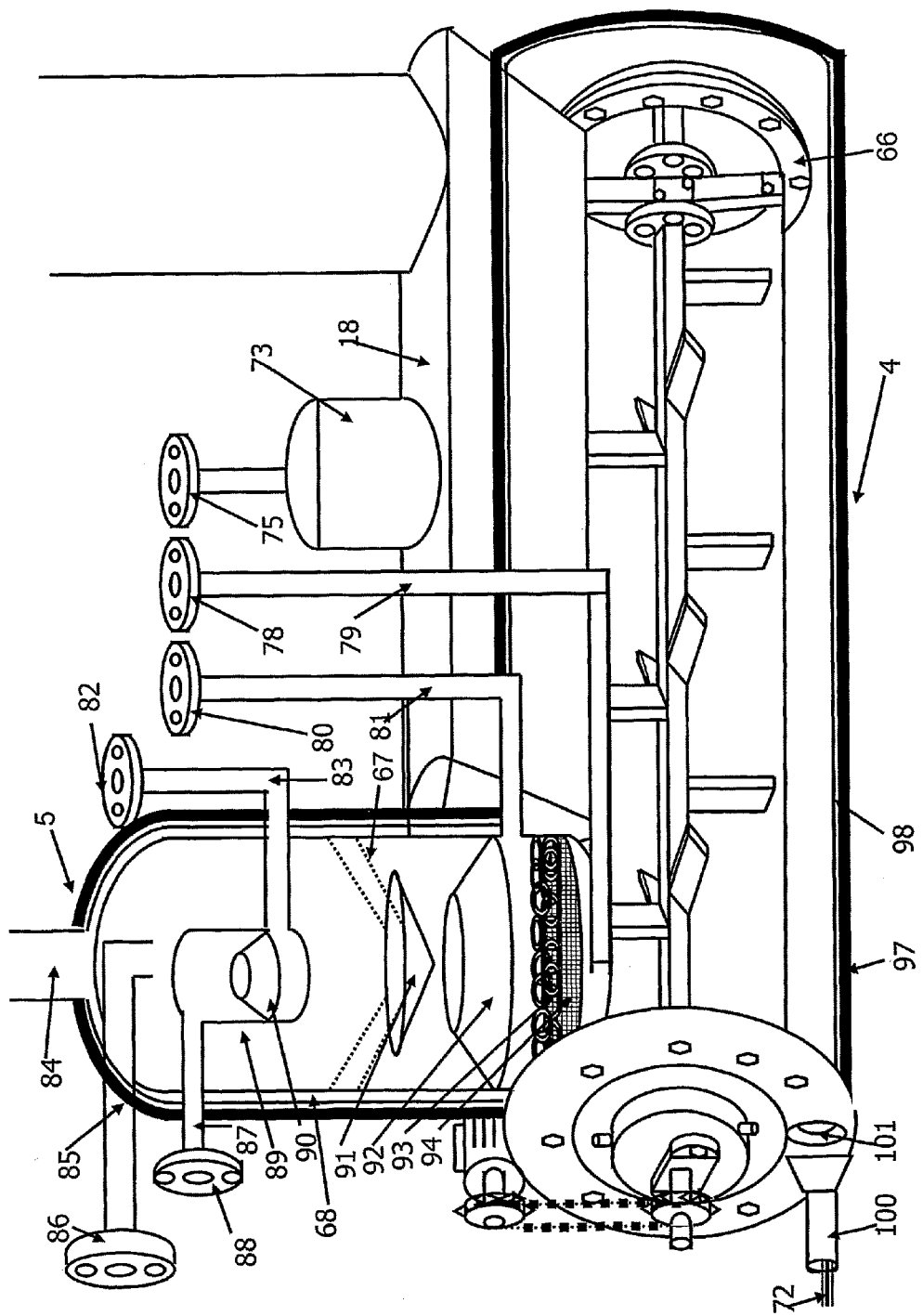
FIG. 7 is a perspective view of the second thermal dissociation reactor of said machine.
Figure 8:
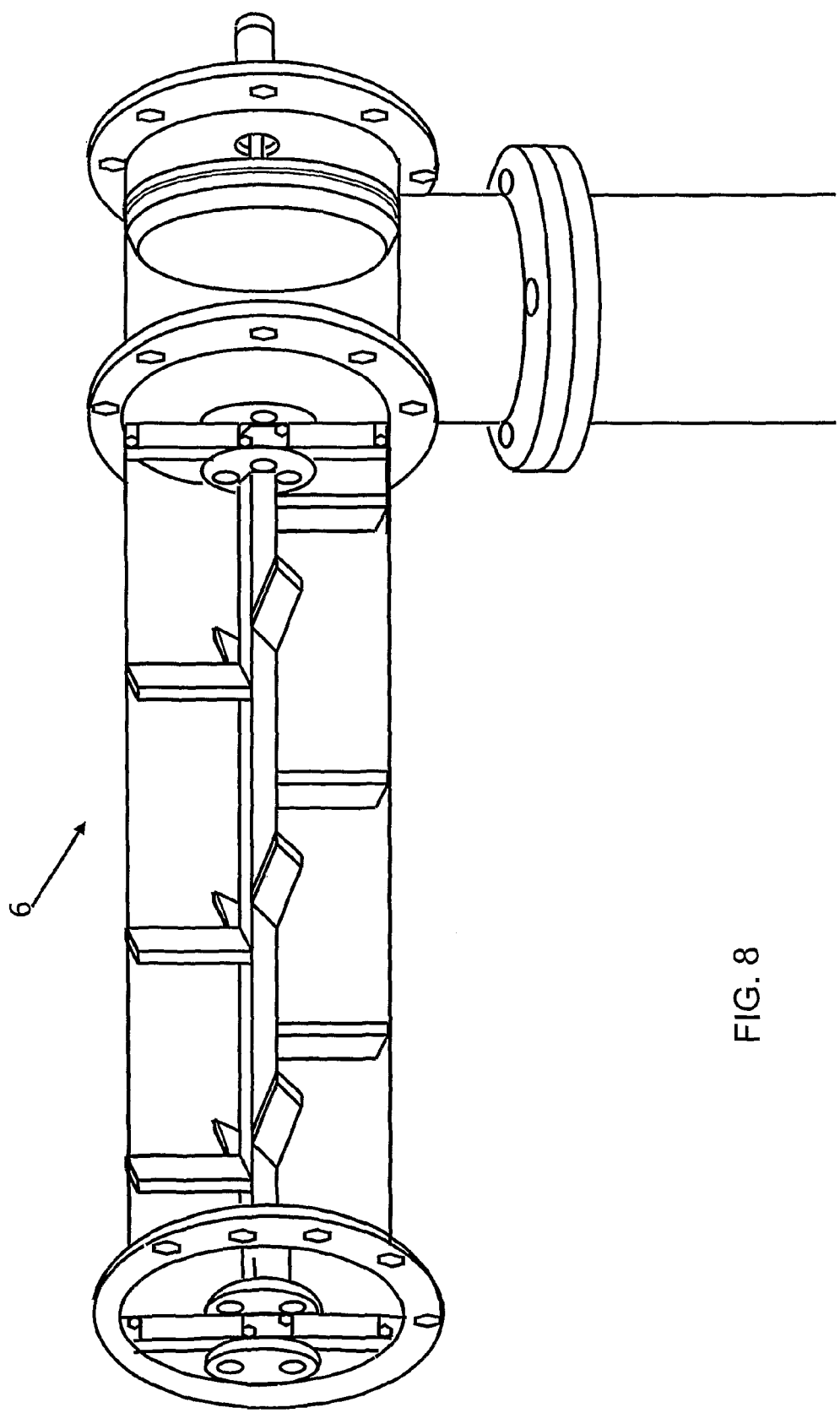
FIG. 8 is a perspective view of the extractor cylinder of the solid portion of the thermal dissociation of the machine.
Figure 10:
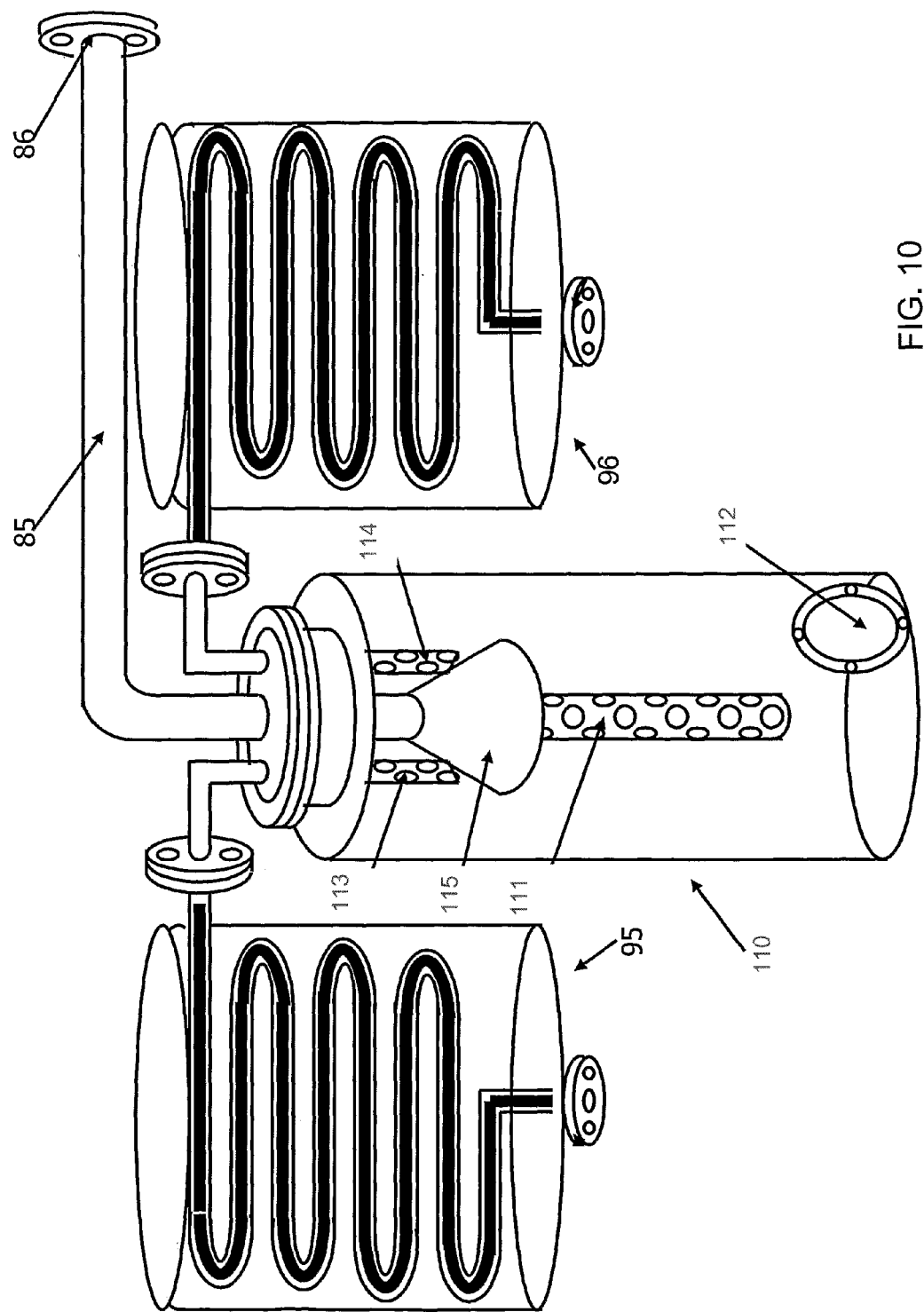
FIG. 10 is a perspective view of the heat exchangers and the separator of heavy hydrocarbons of the processing machine of this application.
Figure 15:
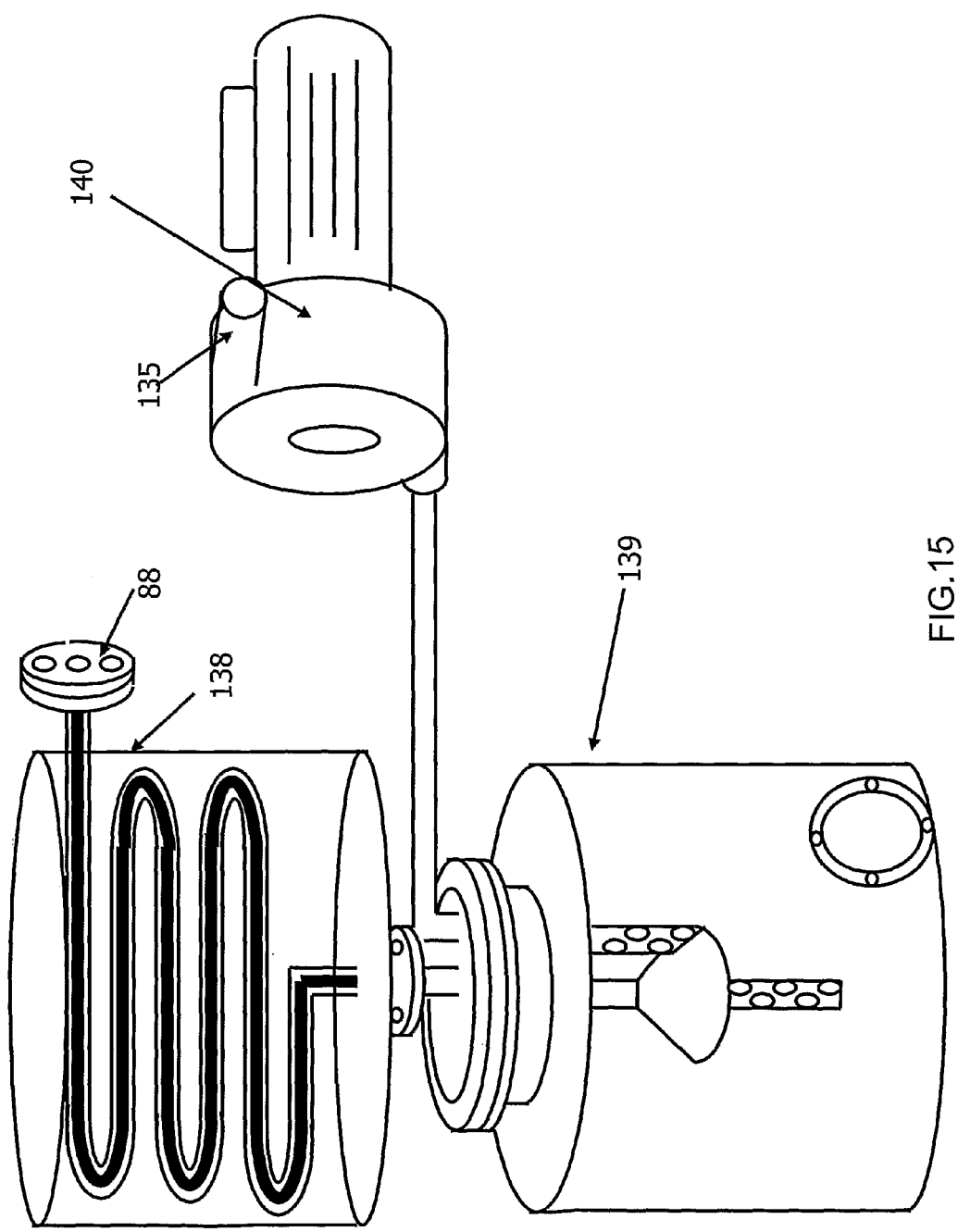
FIG. 15 is a perspective view of the heat exchanger and water separator and vacuum pump of the machine.
Figure 16:
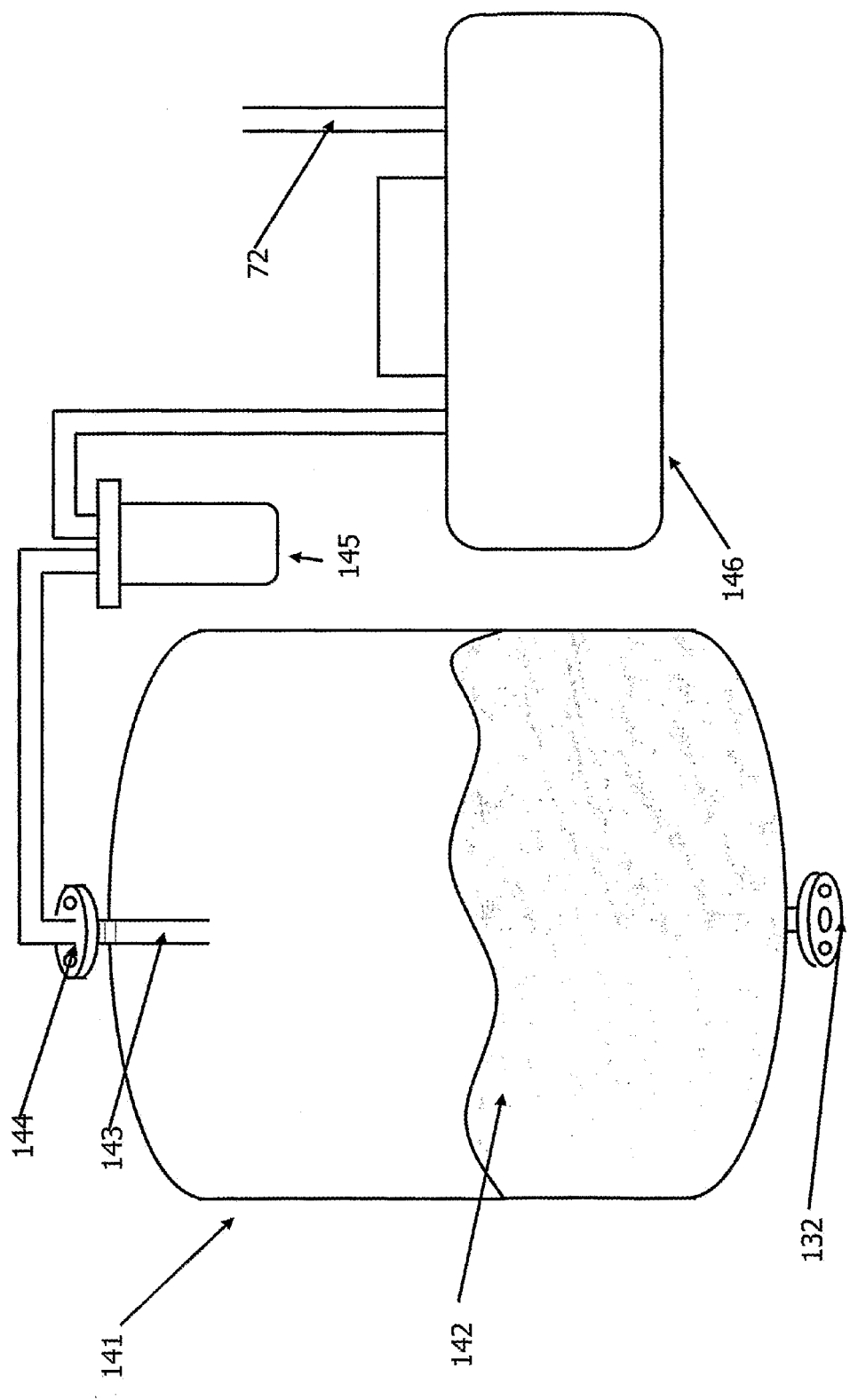
FIG. 16 is a perspective view of a gas-purifying container, a gas filter, and gas storing reservoir of the machine.

Regarding the second thermal disassociation reactor 4 where the final thermal disassociation of the organic and inorganic solid waste takes place. Such second reactor 4 has the same structure as that of the first reactor 3, but with the exception that in this case, the cylindrical body has a bigger longitude at its left end (see FIG. 7), longitude of expansion chamber 18 does not vary, with the intention of leaving a space where a cylindrical expansion tower 5 is placed vertically, which comprises of a cylindrical body 68 opened on its lower end to obtain a connection to the cylindrical body of the second thermal disassociation reactor 4, while its upper end is closed; inside cylinder 68 are situated from bottom to top: a pipe 79, wherein the "crude" vapors are conducted, a filter constituted of a mesh 94 that covers the perforation on cylinder 68, and some metallic rings 93 distributed over the mesh 94, in such a way that they filter thermolytic vapors passing to the cylinder 68, thus preventing the incursion of carbonic particles originated by the disassociation of solid waste; a pipe 81 where the thermolytic vapors enter, a thin plate 92 with a truncated conical shape, placed in an inverted way, that is to say that, the small perforation is facing up and the big perforation is facing down, to slow down the thermolytic vapor ascend, with the help of a cone 91, suspended by braces 67; suspended on the top part of expansion tower 5 lays a sealed reservoir 89, wherein a pipe 83 is coupled to the reservoir's inferior end, where the water vapor and volatile particles are conducted, is worth mentioning that inside of the sealed reservoir 89, there lays a thin plate 90 with a truncated conical shape inversely oriented to slow down the ascend of vapors inside the sealed reservoir 89, wherein a pipe 87 is placed in the upper end, for the extraction of water vapor, thermolytic vapor and air, to be cooled in the heat exchanger 160; (see FIG. 15). Above cylinder 89, there lays a thermolytic vapor extraction pipe 85, that conducts the vapor to the heavy hydrocarbons separator 110, (see FIG. 10), is worth noting that the expansion tower 5, as well as the cylinder and expansion chamber 18 are placed inside a heat "casing" 98, another aspect about this second reactor 4, is that such heat "casing" 98 has a perforation 101 on its left bottom side that connects to a second gas burner 100, providing a temperature of 420 to the interior of the second reactor 4, and inside the expansion chamber 5, and in the top part there lays an escape duct 84 that allows flow of the combustion gases of the burner 100 into the atmosphere, there is an insulator layer 97 on the exterior of "casing" 98 that permits the concentration of heat and avoids its loss. Inside second reactor 4 there is a mixing assembly, that in contrast with first reactor 3 this one only rotates in one way transporting material toward the left end of second reactor 4, and in its right end it couples with the mixing assembly of the extraction chamber 6 of the solid fraction of the thermal dissociation, that also couples with the cylinder of the second reactor 4; it connects to the extraction chamber 6 by means of a conventional couple 66. The extraction chamber of the solid fraction of the thermal dissociation 6, removes these particles from the heat generated inside the second thermal dissociation reactor 4; the solid fraction of the thermal dissociation is composed of carbon, ashes, metallic bits, sands, glass bits, among others, that is to say, all waste that was not susceptible to the thermal dissociation; this chamber is similar in manufacture to the intake chamber 11, and also is heat free, in the same manner it is provided with an interconnection pipe that connects it to the cooling and extraction chamber 7.

Figure 9:
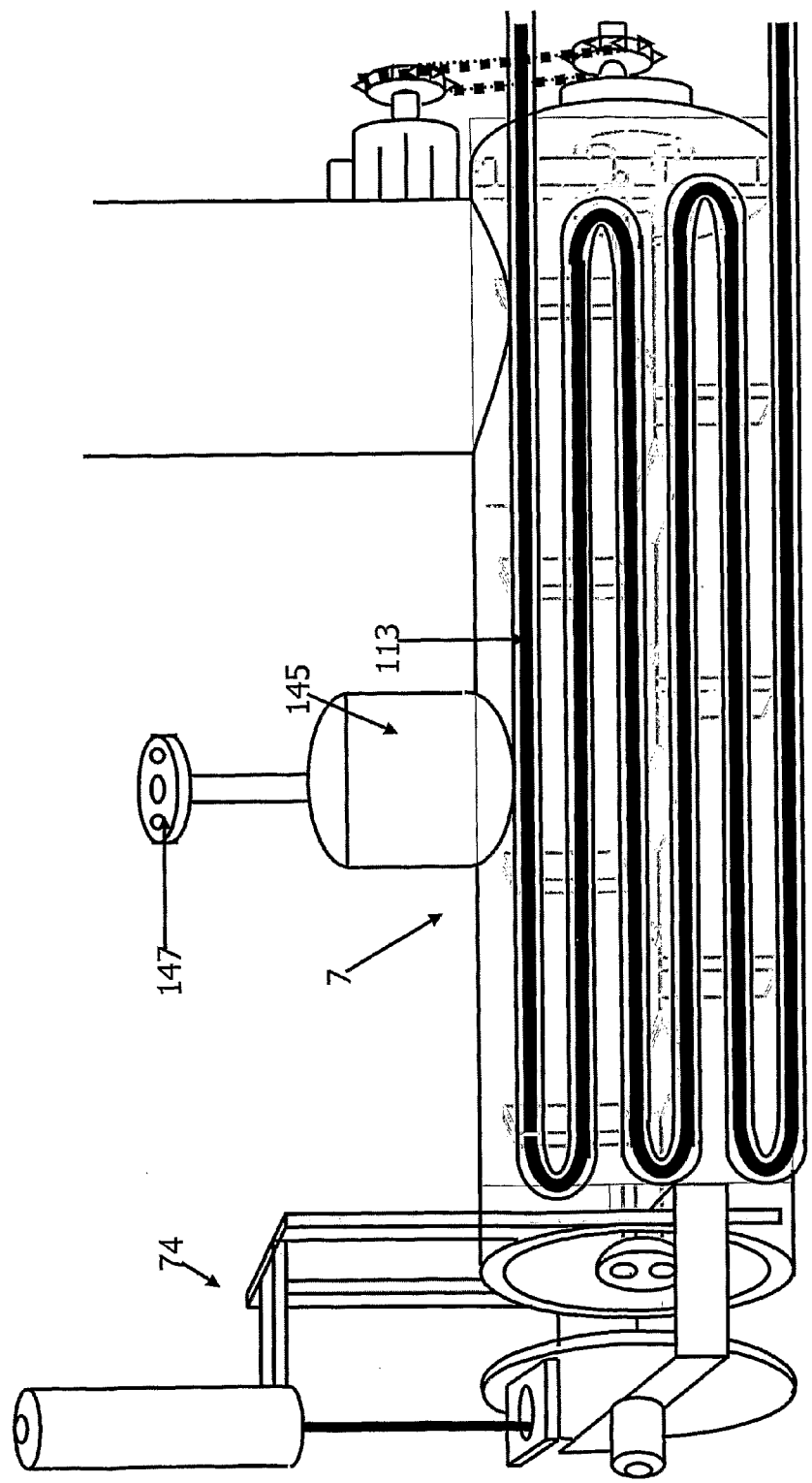
FIG. 9 is a perspective view of the cooling and extraction cylinder of the solid fraction of the thermal dissociation of the machine.

Cooling and extraction chamber 7, is where the solid fraction of the thermal dissociation is cooled in order to be extracted and manipulated, it resembles intake chamber 11, but it houses on its exterior a cooling device 113, that cools down the chamber's interior to a temperature of less than 90 C., its cylinder (see FIG. 9) is provided in its left end with a sealing system 74 equal to that of hopper 15, with the only difference that it is vertically oriented to allow a hermetic sealing, and the extraction of the solid fraction once it cools down, on top of the cylinder there is an extraction tower 122 in which the air entering chamber 7 is extracted, as a result of its aperture.

Figure 11:
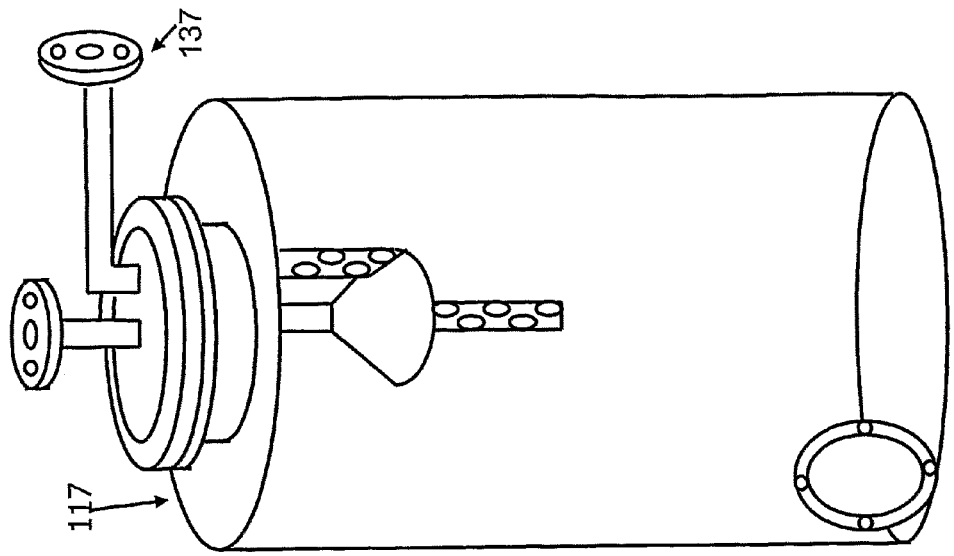
FIG. 11 is a perspective view of the separators of light hydrocarbon of the machine.
Figure 11:
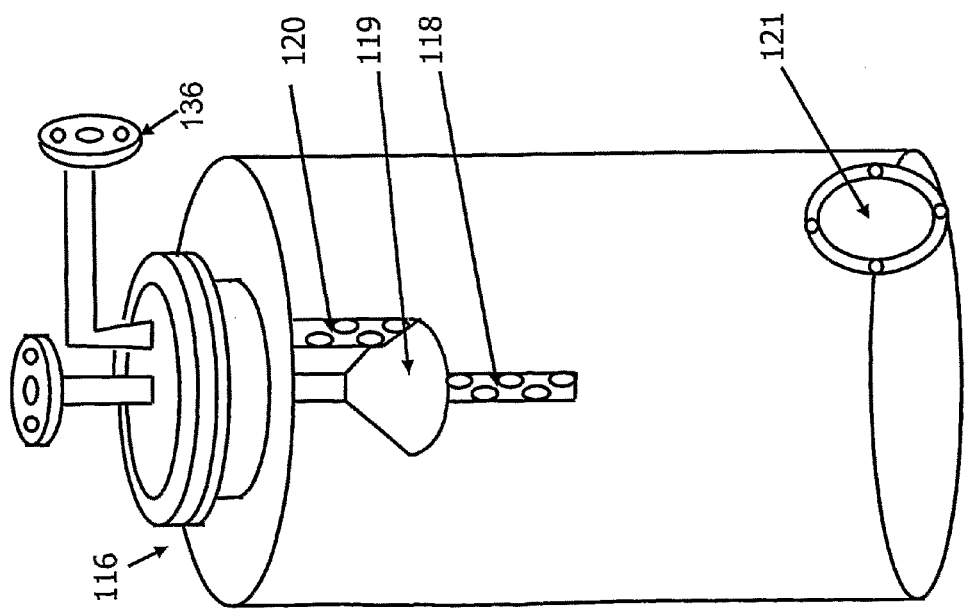
Figure 12:
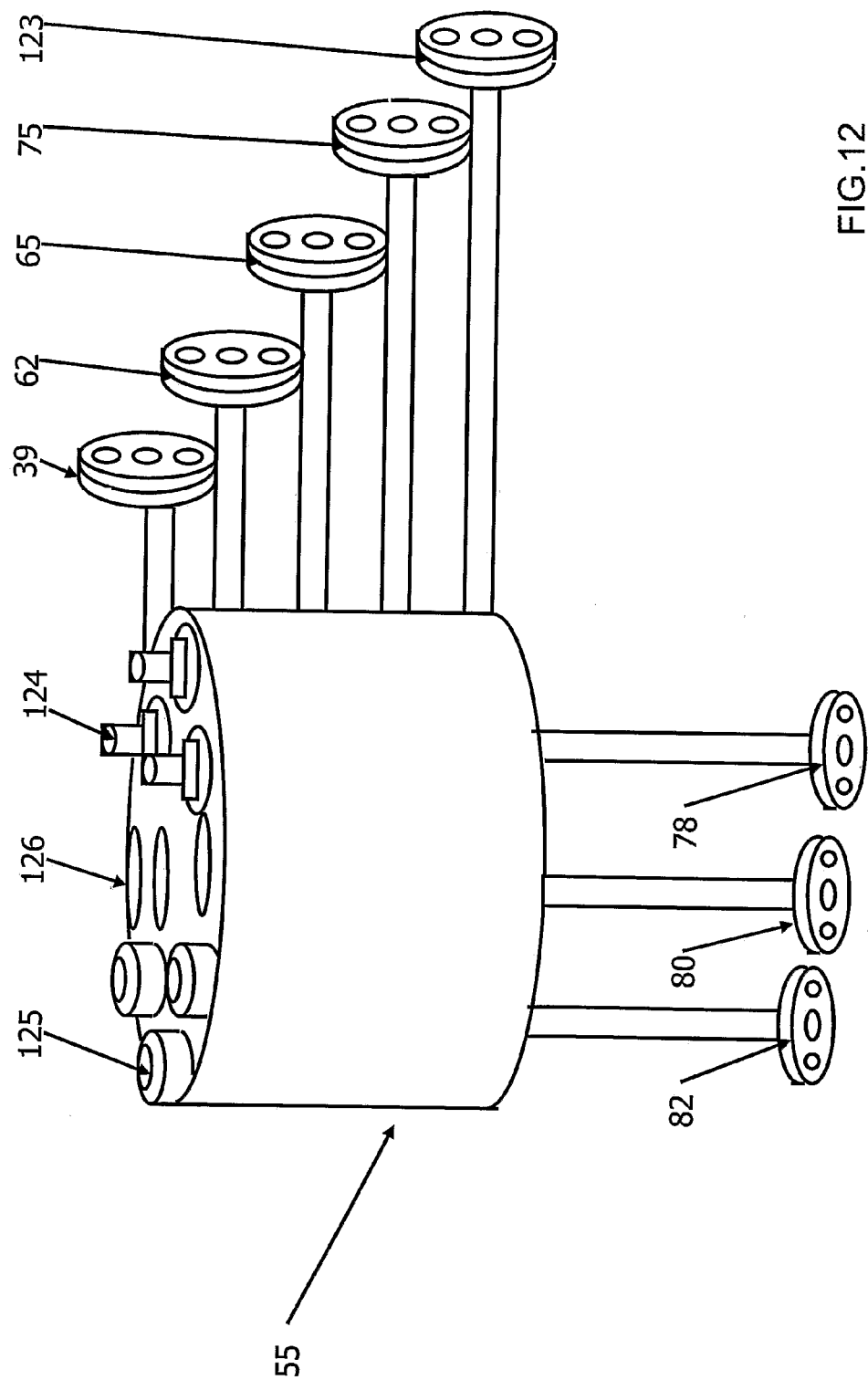
FIG. 12 is a perspective view of a multiple valve of the referenced machine.
Figure 13:
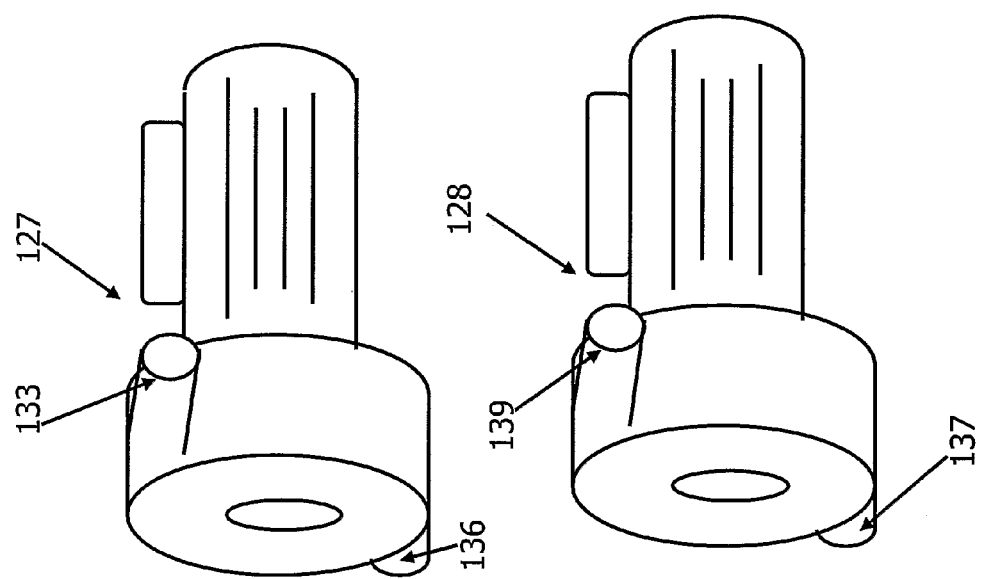
FIG. 13 is a detailed perspective view of the vacuum pumps of the referenced machine.
Figure 14:
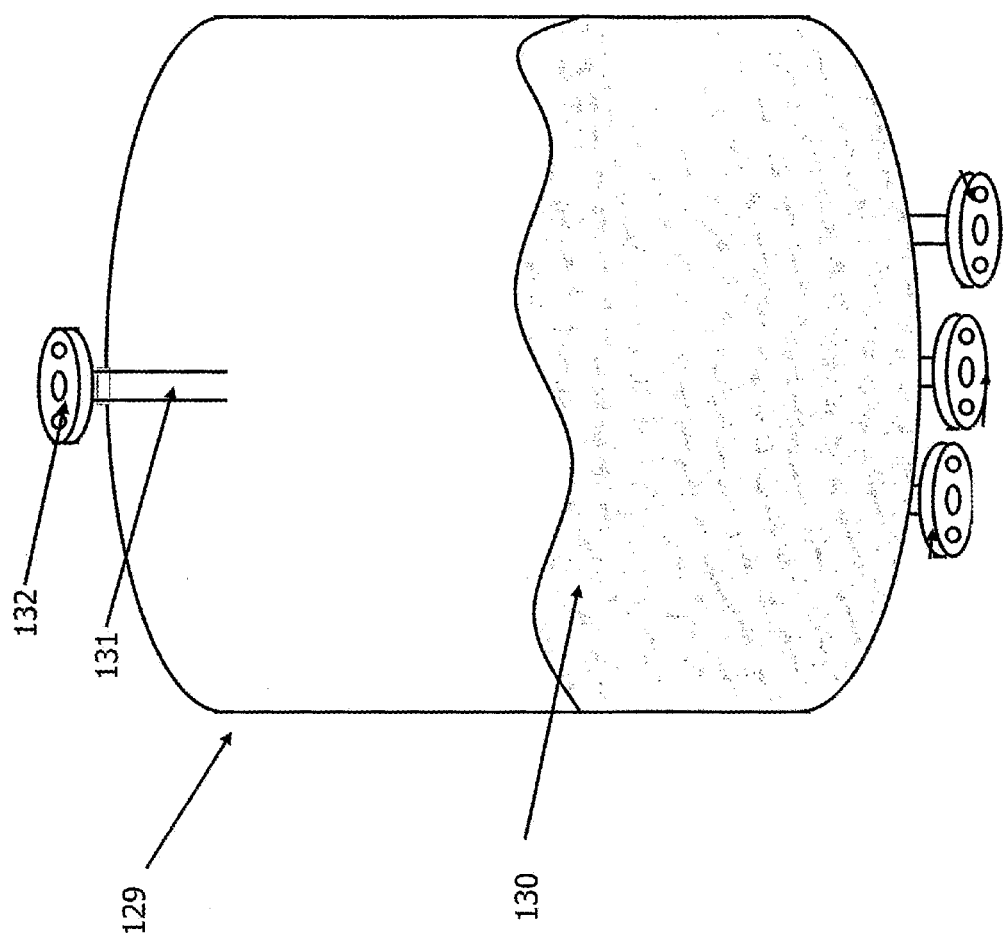
FIG. 14 is a perspective view of a gas-purifying receptacle.

A heavy hydrocarbons separator 110 (see FIG. 10) and two heat exchangers, where 95 is the primary and 96 secondary; this heavy hydrocarbons separator 110 has a cylindrical shape. Here enter the thermolytic vapors that come from expansion tower 5 coupled to it by means of couple 86 and conducted to its interior by pipe 85; inside this heavy hydrocarbons separator 110 lays a pipe with lateral perforations 111 placed in the interior in a vertical way to allow the flow of thermolytic vapors so they condensate inside of it, from the condensed vapor heavy hydrocarbons are formed (paraffin wax) that solidify at a temperature of 60° C., this separator is not provided with a cooling system, due to the fact that only the increment of volume inside the reservoir causes the condensation of thermolytic vapors that give origin to the heavy hydrocarbons, these hydrocarbons are extracted later on by the service lid 112, that is located in the bottom part of separator 110, inside there is a conic trap 115 that is a thin plate welded to pipe 111 to prevent its elevation, so they can be dragged by the extraction pipes 113 and 114, given that these perforated pipes 113 and 114 extract lighten thermolytic vapor to be cooled by means of a heat exchanger 96 secondary or 95 primary, they decrease the thermolytic vapor temperature to 68° C. and conduct it toward light hydrocarbons separators 116 or 117, (see FIG. 11), these heat exchangers 95 primary and 96 secondary are cylindrical shaped reservoir and in its interior are found serpentine shaped pipes, thermolytic vapor circulates inside them, inside the reservoirs circulates liquid refrigerant to dissipate heat from the serpentine, these heat exchangers come in pairs and have the same function and are coupled to the same heavy hydrocarbons separator 110 with the intention that in a given state of the reaction, the production of thermolytic vapor is twice the volume than that of the majority of the thermal dissociation process and this accomplishes an optimal thermolytic vapor extraction, thus an over pressure inside expansion chamber 5 is avoided, on the other hand this exchangers arrangement serves as a method to provide maintenance when required by one of them, in such a way that the thermal dissociation process in not interrupted, the thermolytic vapor cooled by heat exchangers, 95 primary and 96 secondary, is conveyed to the light hydrocarbons separators 116 primary and 117 secondary.

Two light hydrocarbon separators 116 primary and 117 secondary that have a cylindrical shape, vertically oriented, sealed on their ends and constituted of the same components and having in its interior a perforated pipe 118, where the thermolytic vapor cooled down to 68° C. enters, here it is condensed because it its cold and once the volume is increased inside de reservoir that contains them, that is separator 116 primary and 117 secondary, it condenses and forms light hydrocarbons, these separators come in pairs to facilitate the extraction of thermolytic vapor coming from expansion tower 5 as explained earlier, besides giving the opportunity to provide maintenance to one of them without stopping the thermal dissociation system. A trap placed inside separators 116 primary and 117 secondary prevents condensable vapors to be extracted, the most volatile vapor is extracted by a perforated pipe 120 that transports the most volatile vapor to the vacuum pumps 127 primary and 128 secondary that will be explained later, there is a hatchway on the bottom of the cylinder to extract the light hydrocarbons.

A multiple valve 55 that has a cylindrical shape, it is comprised of a solid cylindrical body, that houses in its interior a network of ducts, so that the connection accessories, temperature readers and actuators can be distributed; has couples on one of its ends that couple to the extraction tower 37 of the organic and inorganic solid waste intake chamber 1, by means of couple 39, it also connects extraction tower 63 of the third reactor 3 by a couple 65, also it connects on this end to the extraction tower 122 of the cooling chamber 7, by means of a couple 123 on the other end are placed the connections to expansion tower 5 that couples to it by means of couple 78 that is placed on the bottom part of expansion tower 5, also there is a couple 80 placed on the middle part of the expansion tower 5, and one more connects at this end to the water vapor and volatile particles heating cylinder 89. On to top of the multiple valve 55 we can find three oxygen sensors 124 that determine the amount of "free" oxygen (oxygen that is not part of a molecular chain) of the vapor that arrives to this multiple valve 55 and in this way it determines if this vapor is sent, with the help of valves 125, to the water vapor and volatile particles heating cylinder 89, and thus avoiding thermolytic heat oxidation within the expansion tower, the multiple valve is also provided of temperature readers 126 that help measuring vapor temperature and thus determining if they are "crude" vapors or thermolytic vapor, in case of it being "crude" vapor, with the help of the actuators valves 125, it will redirect them to the lower part 78 of expansion tower 5, in case that the vapors have a temperature of 420° C. it will be considered a thermolytic vapor and will only require a slight residency inside the expansion tower 5 and thus with the help of actuator valves 125 will be directed toward the middle part by means of couple 80, to the expansion tower 5.

Two vacuums pumps 127 primary and 128 secondary; will provide the vacuum pressure of $-0.56$ $Kg/cm^2$ required in the interior of the system and besides that they also suction vapors from the inside of the extraction towers and expansion tower 5 with the help of the multiple valve 55 completing primary and secondary extraction systems respectively. A capturing reservoir of chlorine gas particles that has a cylindrical shape that contains a saline solution 130 $H_2O+(NaCl)$ to capture chlorine particles that can be dragged by volatile vapor formed by a mixture of combustible gases, we call this mixture "synthetic" gas. On the bottom part of the reservoir 129 is where the synthetic gas enters to be mixed momentarily with the solution 130, in this way trapping the chlorine particles in the solution, the "synthetic" gas is extracted from reservoir 129 by means of a pipe 131, that conveys it to another reservoir 141 that connects to it by means of couple 132, and it is placed on top if this reservoir.

There is a third heat exchanger 138, a liquids separator 139, with a cylindrical shape and comprised of the same components as the light hydrocarbon separators 116 and 117, and a vacuum pump 140, this heat exchanger 138 is coupled to the air and volatile particles heater cylinder 89 that is placed inside expansion tower 5, connects to it by means of couple 88 to extract hot vapors coming from the air and volatile particles heater cylinder 89, to be cooled down by heat exchanger 138 to a temperature of 68° C. and once they cool down they condensate to form a mixture of water with light hydrocarbons that later on is treated to separate light hydrocarbons from water and added to the light oil recovered by separators 116 primary and 117 secondary.

A confiner reservoir of sulfur particles 141, that has a cylindrical shape and contains a solution 142 composed of calcium hydroxide $Ca(HO)_2$ and water, to trap any trace1 of sulfur molecules, the "synthetic" gas enters the cylinder on its bottom side, where the solution is resting and as the gas passes through the solution they mix momentarily trapping the sulfur particles that the "synthetic" gas contains, the clean gas is extracted later on from this reservoir by means of a pipe 143 that is coupled to a drying filter 145 that traps in any humidity that the "synthetic" gas might have, next it is stored in collector tank 146 and thus this "synthetic" gas can be used as fuel for heaters 100 and 70 of the forth 4 and third 3 reactors respectively.

Method to Obtain Hydrocarbons from Organic and Inorganic Solid Waste, Introduced in the Thermal Dissociation System, Consisting of:

Preparation of raw material, given the diversity of the waste, it is recommended a pre-selection, given that ferrous, glass and sand waste are not susceptible to thermal dissociation, and in case they access the system they would occupy a valuable space, but they do not affect the functionality, and given that there is waste with ferrous and glass mixtures, they will not be excluded because they can be processed to obtain a hydrocarbon from the fraction that is susceptible to the thermal dissociation, remaining, without any alteration the material that are not susceptible to the thermal dissociation, not being the selection indispensable, to obtain hydrocarbons from organic and inorganic solid waste, once the waste bits have been selected, those being of a bigger size than that of the superior aperture 16 of hopper 15 must be crushed by means of a conventional crusher, to allow its access, besides all waste that can be reduced in volume, this with the intention of increasing the system's capacity, it is worth mentioning that crushing is not indispensable for the system; waste is transported to the intake hopper 15 by means of a conventional dispenser, organic and inorganic solid waste enters through the hopper's 15 superior aperture 16, this is accomplished by means of the extraction mechanism 76, that retracts lid 20 where the actuator piston 22 retracts the ring's 19 lid 20 and by means of a second piston 23, slides the lid leaving the hopper's apertures free, waste gets inside intake chamber 11 which is at ambient temperature with the intention of impeding a thermal shock that could form toxic compounds like dioxins, that is coupled on the top to hopper 15, that was previously sealed on its opposite side by interconnection valve 10, at the same moment as the waste enters, the motor 35 starts working to rotate the mixing assembly, with the intention of transporting and accommodating the waste inside the intake chamber 11, once they fill all the space inside such chamber, proceeds the sealing of the hopper 15 with the retraction mechanism 76 that is activated inversely, the piston 23 pushes the lid 20 over the ring 19 and the piston 22 pushes toward the ring 19 allowing a hermetic seal of the system, avoiding any intrusion of air inside the intake chamber 11, once the chamber is sealed the mixing assembly continues to rotate alternating its direction every 60 revolutions, meanwhile by means of the extraction tower 37, air and volatile particles that accompany the waste, they are suctioned by the action of the vacuum pump 140 that generates a vacuum inside the intake chamber of $-0.56$ $Kg/cm^2$, this suction is carried out from the multiple valve 55, that later on are passed to the heating cylinder 89 that is located inside the expansion tower 5, that has a temperature of 420, given that heating the air and volatile particles in a sudden manner dissociates the molecular bonds to form a thermolytic vapor, that also may contain pathogen agents like viruses and so forth, that would be killed when exposed to this temperature and would also form a thermolytic vapor, from here they are directed toward the heat exchanger 138 that cools down the air and thermolytic vapor to a temperature of 68 C., later on it is directed to a liquids separator 139 where once it cools down condensates leaving a liquid hydrocarbon sediment mixed with small water particles, the most volatile fraction is suctioned from the separator by means of a vacuum pump 140, that directs it to a gas purifier 129, here it mixes with the solution 130 that captures any trace of chlorine particles and later on it is directed to a gas purifying reservoir 141 where the gas mixes with the solution 142 to capture any trace of sulfur, then it is directed to the moisture filter 145, leaving a clean gas that can be stored in an accumulation reservoir 146 to be used later on as combustible for burners 70 and 100. Besides, the mixing assembly helps to get rid of air and volatile particles from the waste that is going to be processed given that it is in constant movement, the mixing assembly plates 9 break any air bubbles encapsulated inside the organic and inorganic waste, thus avoiding oxidation of the waste inside the system. The residency time of the organic and inorganic solid waste inside the chamber 11 to get rid of any trace of air and volatile particles is determined by the time it takes to reach −0.56 Kg/cm² inside the chamber and an additional 50% of residency time is added, for example if it took 10 minutes then 5 minutes are added, during all this time the vacuum pump 140 is suctioning and the mixing assembly alternating rotation. Finishing the residency time, suctioning is stopped inside the intake chamber 11 and the mixing assembly rotates on a displacement way to convey the waste to the interconnection valve 10, that is coupled to the ring 41, and by means of actuator piston 46 retracts the valve allowing it to be slide through the calibrated cylinder 53, in this way the waste leaves the intake chamber 11, thanks to the bottom perforation 48 of the calibrated cylinder 53 in which an interconnection vertical pipe 47 is coupled, and in its opposite side directs the waste to the dehydration chamber 2, once chamber 11 is discharged the interconnection valve 10 is returned to its hermetic sealed position, and once again filling of the intake waste chamber 11 takes place, this is a semi-continuous process.

Dehydration of organic and inorganic solid waste takes place by means of a waste dehydration chamber 2, waste directed from the intake chamber 11 propelled by the mixing assembly fall out inside the dehydration chamber 2, the chamber has been preheated to 180 C. at the moment that the solid waste enters, it is worth mentioning that this temperature is reached due to a gas burner that heats the exterior of the cylinder and in this way it protects the waste from the direct flame avoiding its combustion, heat is conducted by a heat "casing" 59, besides this chamber is under a vacuum of −0.56 Kg/cm², with the intention of getting rid of any moisture trace that may accompany the waste, in the interior we find the mixing assembly alternating rotation, in the same way as the intake chamber 11, with the only difference that this assembly helps to diffuse heat among all waste, thus reducing residency time inside this chamber, also the water vapor generated elevates from the cylinder to the expansion chamber 12, allowing an easier separation and a quick liberation of moisture that they may carry. In this way waste entering this chamber 2 absorbs heat contained within, lowering the internal temperature and preventing a thermal shock, it also allows a gradual temperature increment preventing an over production of water vapor that would cause an unwanted over pressure inside of the thermal dissociation, during all this time vapors are being suctioned with the help of the vacuum pump 140, and by means of extraction tower 56 are directed to the multiple valve 55, and later on to the cylinder 89 as well as the air and volatile particles of intake chamber 11, its subsequent process is the same as the one described before; residing time inside the dehydration chamber 2 depends on the heat absorption time, that is to say that, once the waste enters, the temperature within the chamber decreases, then the time it takes to reach a temperature of 180 C. once again is measured and then a 50% more is added, for example: if it takes 6 minutes to absorb the heat then 3 more minutes are added, this is the ideal residency time that varies depending on the kind of waste being processed, during all this time the mixer assembly keeps alternating rotation, once the residency time ends it is directed to the interconnection valve 10 of the dehydration chamber 2, it retracts and allows the discharge of the waste to the first thermal dissociation chamber 3, later on once such chamber is discharged, the valve returns to its sealed position, in such a way that once again the waste coming from intake chamber 11 is introduced on its top side so it can be dehydrated.

Thermal dissociation of organic and inorganic solid waste takes place inside first thermal dissociation chamber 3, wherein formation of a vapor takes place from which hydrocarbons are recovered from organic and inorganic solid waste, in a such a way that the waste enters through the interconnection pipe 47 to the interior of the first thermal dissociation reactor 3, previously pre-heated to a temperature of 280°, in the same way as in the dehydration chamber 2 once the waste enters, the temperature inside drops because it absorb heat, and the residency time is determined in the same way as in the previous chamber, also the mixing assembly keeps alternating its rotating orientation, with the distinctiveness that in this first reactor 3, heating the waste mixture originates its thermal dissociation, in such a way that a "crude" vapor is formed consisting of molecular chains that once condensed form a low calorific power hydrocarbon, this vapor is separated from the waste mixture inside the first reactor 3, ascending inside an equal atmosphere in the expansion chamber 60, in order that the dissociation takes place in a faster rate, and with less fuel consumption, this vapor is extracted by the extraction tower 63 and directed to the multiple valve 55 where the temperature and "free" oxygen level are measured, "crude" vapor is determined by means of the oxygen sensors 124, and the temperature by means of thermometers 126, in case that this vapor carries some trace of "free" oxygen it is directed to the lower part of the expansion tower 5 by means of pipe 79, so this "crude" vapor can be heated to create a thermolytic vapor, this vapor carries a temperature of 420° C. and from it high calorific power hydrocarbons can form, once the residency time inside the thermal dissociation reactor 3 is over, a "viscous mass" is formed from the organic and inorganic solid waste subjected to the thermolytic dissociation, inside the reactor this waste melts, creating a homogeneous mixture, constituting a "viscous mass" from which not all the hydrocarbons have been extracted yet, this mass is directed to the end of first reactor 3 where the interconnection valve 10 is located, which in turn retracts allowing the flow toward the second thermal dissociation reactor 4, once the first reactor 3 is discharged an hermetic sealing forms by means of the valve 10, thus allowing the access of waste coming from the dehydration chamber 2 and continue with the process.

Thermal dissociation takes place in two reactors, in such a way that in the first reactor temperature is gradually risen to 280 C., commencing from this temperature the majority of the "crude" vapor generation takes place, consequently the waste is directed to a second thermal dissociation reactor 4, that has been pre-heated to a temperature of 420 C. This is the ideal temperature to form high calorific power hydrocarbons, in this second reactor all the material susceptible to the thermal dissociation is transformed into thermolytic vapor, that ascends to the expansion chamber 18 with the help of the mixing assembly from the second reactor 4, with the distinctiveness that this assembly rotates only in one direction transporting the processing material to the end where expansion tower 5 is located, this mixer assembly helps to separate vapors generated by the thermal disassociation given that the plates blend the mixture in such a way that it helps releasing the thermal vapor from the solid fraction of the thermal dissociation, composed of: carbon, ashes, metallic bits, glass and sand; the vapor generated on this second reactor 4 is extracted through the extraction tower 73 and conducted toward the multiple valve 55 that determines the vapor's temperature and directs it toward the expansion tower 5 that is coupled on the end of the second reactor 4, here the "crude" and thermolytic vapors stay the necessary time to homogenize so an ideal thermolytic vapor can be obtained from which high calorific hydrocarbons can be formed. The thermolytic vapor extracted from the expansion tower 5 is directed toward a heavy liquid hydrocarbons separator 110 where the heavy molecular chains are separated from the lighter and volatile ones to form a heavy liquid hydrocarbon (paraffin wax), this takes place due to the expansion of a vapor on a hermetic container, and the lighter vapor is extracted from such separator to be cooled down by the heat exchangers 95 and 96 (from this point on the vapor extraction line of the system is provided with twice the devices forming a double extraction line composed of heat exchangers, light hydrocarbons separators and vacuum pumps, these lines are finished at the gas purifier 129, this with the intention of coping with any overproduction of thermolytic vapor inside the system, also permitting maintenance without bringing the process to a halt), the heat exchangers 95 and 96 cool the vapor down to 68 C., this is the temperature where the vapors condensate and are trapped in the light hydrocarbons separators 116 and 117, where the lighter chains are separated from the volatiles ones to form a light liquid hydrocarbon, the more volatile ("synthetic" gas) is extracted from these separators by means of the vacuum pumps 127 and 128, they extract the generated vapors and direct them toward a purifying reservoir 129, where they mix with a solution 130 and after a momentary combination, the chlorine particles that might have been carried by the "synthetic" gas are trapped, then this gas is directed to a purifying reservoir 141 that contains a solution 142 and in the same way as before the sulfur particles that might have been carried by the "synthetic" gas are trapped, this gas is directed toward a moisture filter 145 where this gas is dried out so it can be stored on an accumulation reservoir 146, to be used later on as fuel for the burners 100 and 70, achieving a cost-effective system process, besides being environmentally safe, given that the emissions of the combustion of this "synthetic" gas are not harmful to the atmosphere. In this way the system operates in a very safe and efficient way, in a closed circuit, preventing the contact of the thermolytic gas with the environment. The residency time of the matter inside of the second thermal disassociation reactor 4 is calculated by the time it takes to the processing material to absorb the heat, given that once the material coming from the first thermal dissociation reactor 3 enters the second reactor 4 the temperature drops and it takes some time to reach a temperature of 420 C. again, to this time a 75% is added, for example if it takes 10 minutes then 7.5 minutes of residency are added.

Residues of the solid fraction of the thermal dissociation composed of carbon, ashes, metal bits, glass and sand that were not subjected to the thermal dissociation, are taken away from the heat of the second thermal dissociation reactor 4 with the help of the mixing assembly shared by the extraction chamber 6 and the second reactor 4, this extraction chamber 6 takes away the solid fraction from the heat of the second reactor, achieving this with the help of the mixing assembly that rotates inversely transporting the waste toward the interconnection valve of the extraction chamber 6, the valve retracts and allows the flow toward the cooling chamber 7 of the solid fraction of the thermal dissociation, where the fraction cools down to a temperature of 90 C. so it can be handled, with the help of a cooling system 113 that circulates a liquid refrigerant that dissipates out the heat inside the chamber, that is hermetically sealed on one end by the interconnection valve of the extraction chamber 6, and on the opposite end by the sealing mechanism 74. It is worth mentioning that on this end the solid fraction of the waste is extracted to separate the metals, glass bits and sands and to only leave a mixture of carbon and ashes that is stored on the conventional sacks, to be distributed and traded later on; it is worth mentioning that during the extraction of the solid fraction from this chamber, air enters inside the cooling chamber 7, once it is sealed by the sealing mechanism 74, this air is extracted by means of the extraction tower 122, that directs it toward the multiple valve 55 redirecting them toward the cylinder 89, that heats this air and once it is extracted it cools down to a temperature of 68 C. on the heat exchanger 138, then it is directed to the separator 139 where any trace of moisture is condensed and later on the more volatile gas is extracted by means of vacuum pump 140, then to a drying filter 146, and finally to an accumulator reservoir 145. This air is mixed with the "synthetic" gas achieving an excellent combustion.

What is claimed is:

1. A system for obtaining hydrocarbons from organic and inorganic solid waste comprising:
   a hopper for receiving solid waste disposed on a waste intake chamber;
   said intake chamber operated at ambient temperature comprising a first mixer assembly for mixing and conveying the solid waste through said intake chamber and an extraction tower for air and volatile particles;
   a dehydration reactor preheated to a temperature of 180° C. for receiving the solid waste from said waste intake chamber;
   said dehydration reactor comprising a second mixer assembly and an expansion chamber and extraction tower for water vapor;
   a first thermal disassociation reactor connected to said dehydration reactor;
   said first thermal disassociation reactor preheated to a temperature of 280° C., and maintaining a vacuum pressure of −0.56 Kg/cm$^2$ to form crude vapors and comprising an expansion chamber and extracting tower;
   a second thermal disassociation reactor in series with said first thermal disassociation reactor to form thermolytic vapors, and comprising an expansion chamber and extracting tower;
   an extraction chamber for a solid fraction of a solid waste received from said second thermal disassociation reactor;
   a cooling chamber for cooling said solid fraction of the solid waste received from said second thermal disassociation reactors;
   an expansion tower to form an ideal thermolytic vapor comprising a vapor and volatile particles heating cylinder;
   a first cylinder for separating heavy hydrocarbons received from said first and second thermal disassociation reactors;
   said first cylinder disposed between a first and a second thermolytic vapor heat exchangers;
   a second and a third cylinder for separating light hydrocarbons; said second cylinder connected to said first thermolytic vapor heat exchanger and said third cylinder connected to said second thermolytic vapor heat exchanger;
   a fourth cylinder for separating liquids;
   a third heat exchanger attached to said fourth cylinder;
   a first and a second synthetic gas purifying reservoirs for purifying gas;
   three vacuum pumps connected to said first synthetic gas purifying reservoir;
   a first of said three vacuum pumps connected to said second cylinder;
   a second of said three vacuum pumps connected to said third cylinder;

a third of said three vacuum pumps connected to said fourth cylinder;

a synthetic gas accumulating reservoir attached to said second synthetic gas purifying reservoir; and a multiple valve comprising one or more temperature readers and one or more oxygen sensors that determine the temperature and oxygen content of crude and thermolytic vapors coming from one or more extraction towers and one or more expansion towers through a network of ducts, said multiple valve distributing the crude and thermolytic vapors with one or more actuator valves to either said vapor and volatile particles heating cylinder or a lower part of said expansion tower or a middle part of said expansion tower to form an ideal thermolytic vapor depending on their oxygen content and temperature in order to optimize the production of hydrocarbons.

2. A semi continuous method to obtain hydrocarbons from organic and inorganic solid waste comprising:

preparing raw material;

selecting waste that is susceptible to thermal dissociation;

filling an intake chamber, which is at ambient temperature, via a dispenser through a superior aperture of a hopper via an extraction mechanism on a hopper lid;

leaving the aperture of the hopper free of any waste;

sealing the intake chamber hermetically via the hopper lid;

distributing the waste inside the intake chamber by means of a mixing assembly;

creating a negative vacuum pressure in the intake chamber by extracting air and volatile particles via a vacuum pump;

removing and breaking down air bubbles via the mixing assembly and achieving a vacuum pressure of $-0.56$ $Kg/cm^2$;

directing the solid waste to a dehydration chamber via the mixing assembly that propels it to the end of the intake chamber, where an interconnection valve is located that allows the flow of the waste and from the intake chamber to the dehydration chamber, via a vertical interconnection pipe;

dehydrating the waste inside the dehydration chamber;

preheating the dehydration chamber to a temperature of 180° C.;

creating a constant vacuum pressure of $-0.56$ $Kg/cm^2$ in the dehydration chamber;

removing and releasing moisture out of the solid waste as water vapor through an extraction tower and allowing the separation of the moisture from the dehydrated solid waste, such waste remaining on the bottom of the dehydration chamber;

transporting the dehydrated waste to a first thermal dissociation reactor, thermally dissociating the organic and inorganic solid waste via the first thermal dissociation reactor preheated to a temperature of 280° C., and maintaining a vacuum pressure of $-0.56$ $Kg/cm^2$, which forms a "crude" vapor;

extracting the "crude" vapor via a vacuum pump;

directing the crude vapor extracted from the first thermal dissociation reactor to a multiple valve that confirms the presence of crude vapor and then directs the crude vapor to an expansion tower that heats the crude vapor to form an ideal thermolytic vapor;

transporting the remaining solid waste from the first thermal dissociation reactor to a second thermal dissociation reactor via a mixing assembly of the first reactor that propels the waste toward a second interconnection valve that allows the flow of the waste between the first thermal dissociation reactor and the second thermal dissociation reactor and also provides hermetic sealing between the reactors;

pre-heating the second thermal dissociation reactor to a temperature of 420° C. and maintaining a vacuum pressure of $-0.56$ $Kg/cm^2$;

separating a thermolytic vapor from the thermal dissociation of the solid fraction, leaving this fraction deposited inside the second thermal dissociation reactor;

extracting the thermolytic vapor from the second thermal dissociation reactor by means of a vacuum pump;

directing the thermolytic vapor to the multiple valve that determines and directs the vapor toward an expansion tower where the thermolytic vapor stays to form more ideal thermolytic vapor;

heating the thermolytic vapor by means of the expansion tower coupled to the second reactor, such tower is heated to a constant temperature of 420° C. and maintaining a vacuum pressure of $-0.56$ $Kg/cm^2$;

extracting the ideal thermolytic vapor from the expansion tower by means of a pipe located on top of the expansion tower;

separating heavy liquid hydrocarbons from lighter hydrocarbons present in the ideal thermolytic vapor, by means of a separator that separates the ideal thermolytic vapor in a heavy liquid hydrocarbons separation reservoir, where the vapor enters and condensates due to the expansion inside this reservoir;

cooling the lighter hydrocarbons left in the ideal thermolytic vapor;

dividing light hydrocarbons from volatile hydrocarbons by condensing the light hydrocarbons to form a light hydrocarbons liquid;

suctioning the volatile hydrocarbons, by means of one or more vacuum pumps that suction the volatile hydrocarbons;

directing the volatile hydrocarbons to a separator and a heat exchanger, and a purifying reservoir;

capturing the chlorine of a "synthetic" gas inside of a purifying "synthetic" gas reservoir wherein a solution of H2O+(NaCl) is found, that liberates the "synthetic" gas from any trace of chlorine particles;

capturing the sulfur from the "synthetic" gas, inside the purifying "synthetic" gas reservoir wherein a solution of Ca(HO)2+H2O is found, that at the moment of mixing momentarily with the "synthetic" gas liberates the "synthetic" gas from any trace of sulfur particles;

eliminating the moisture from the "synthetic" gas by means of a filter that captures any moisture carried by the gas;

storing the "synthetic" gas inside an "synthetic" gas accumulation reservoir where it is stored momentarily to be used later on as a combustible for burners of the system;

transporting the solid fraction of the thermal dissociation composed of carbon, ashes, ferrous bits, glass, and sands, that are extracted from the second reactor toward an extraction chamber, via the mixing assembly;

coupling the extraction chamber to one end of the second reactor to release the solid fraction from the heat that is propelled toward the interconnection valve which allows the flow of the waste between the second thermal dissociation reactor and the extraction chamber;

transporting the solid fraction of the thermal dissociation from the extraction chamber toward a cooling chamber via the mixing assembly of the extraction chamber that propels the solid fraction toward the interconnection valve that allows the flow of such fraction between the extraction chamber and the cooling chamber;

providing an hermetic seal between the extraction chamber and the cooling chamber;

cooling the solid fraction of the thermal dissociation by means of the cooling chamber with a cooling system that dissipates the heat from inside;

extracting the solid fraction of the thermal dissociation by means of the cooling chamber provided in its interior with a mixing assembly, that propels such fraction toward the end where a sealing mechanism is located, in a retracted state, and thus propelling such fraction to the exterior of the cooling chamber; and separating the solid fraction of the thermal dissociation comprising a mixture of carbon, ashes, ferrous bits, glass via a sieve it separates non-ferrous bits and with an electromagnet ferrous bits.

3. The semi continuous method of claim 2, wherein bigger sized chunks of solid waste used for filling in the intake chamber are triturated at the top part of the aperture of the hopper before being placed inside the intake chamber, thereby reducing the volume of the waste.

* * * * *